United States Patent
Rotter et al.

[11] Patent Number: 5,901,143
[45] Date of Patent: May 4, 1999

[54] METHOD OF OPERATING A BROADBAND LINK BETWEEN A MOBILE TERMINAL AND A NETWORK-SIDE MOBILE RADIO FACILITY, AS WELL AS MOBILE TERMINAL, NETWORK-SIDE MOBILE RADIO FACILITY, AND MOBILE RADIO SYSTEM

[75] Inventors: Thomas Rotter, Plochingen; Hans Jürgen Lorenz, Sachsenheim, both of Germany

[73] Assignee: Alcatel Alsthom Compagnie Generale d Electricite, Paris, France

[21] Appl. No.: 08/800,076

[22] Filed: Feb. 12, 1997

[30] Foreign Application Priority Data

Feb. 13, 1996 [DE] Germany ............. 196 05 223

[51] Int. Cl.⁶ .................. H04J 3/24; H04Q 7/20
[52] U.S. Cl. ............. 370/329; 370/349; 455/452
[58] Field of Search ............. 370/328, 329, 370/337, 347, 349, 389, 409, 420, 465, 469, 474; 455/445, 450, 452, 500, 509, 517, 560

[56] References Cited

U.S. PATENT DOCUMENTS

| | | | |
|---|---|---|---|
| 5,404,355 | 4/1995 | Raith | 370/311 |
| 5,446,739 | 8/1995 | Nakano et al. | 370/337 |
| 5,590,133 | 12/1996 | Billstrom et al. | 370/349 |
| 5,734,645 | 3/1998 | Raith et al. | 370/329 |
| 5,742,592 | 4/1998 | Scholefield et al. | 370/329 |
| 5,793,744 | 8/1998 | Kanerva et al. | 370/209 |
| 5,802,465 | 9/1998 | Hamalainen et al. | 455/452 |

FOREIGN PATENT DOCUMENTS

| | | |
|---|---|---|
| 0663785 | 7/1995 | European Pat. Off. . |
| 0671824 | 9/1995 | European Pat. Off. . |
| 0687078 | 12/1995 | European Pat. Off. . |
| 4313388 | 1/1994 | Germany . |
| 9521508 | 8/1995 | WIPO . |
| 9524806 | 9/1995 | WIPO . |

OTHER PUBLICATIONS

"Frame Relay: eine Netztechnologie ist im Kommen", R. Hockmann, *Wandel & Goltermann bits* 61, Jan. 7, 1992, pp. 4–5.

*Primary Examiner*—Alpus H. Hsu
*Attorney, Agent, or Firm*—Ware, Fressola, Van Der Sluys & Adolphson LLP

[57] ABSTRACT

The invention concerns a method of operating a broadband link for the exchange of data (DAT) between a mobile terminal (MS) and a network-side mobile radio facility (MSC), as well as the mobile terminal (MS), the network-side mobile radio facility (MSC) and a mobile radio system. Two or more radio channels to the mobile terminal (MS) are established and assigned as subchannels (C1 to CN) to the broadband link. The data (DAT) are then transmitted via the subchannels (C1 to CN) between a terminal-side entity (ENMT) and a network-side entity (ENNET) of a communications layer (L2), where the entities (ENMT, ENNET) exchange the data (DAT) as data packets (FRDAT1, FRDAT2) in accordance with a transmission protocol, and control the distribution of the stream of data packet to the subchannels (C1 to CN) as well as its recombination. The protocol (PROT) defines and supports two or more different packet types for transportation of the data. The entities (ENMT, ENNET) recognize these different packet types and process them differently as different logical channels (LC1, LC2) of the same communications layer (L2).

11 Claims, 3 Drawing Sheets

METHOD OF OPERATING A BROADBAND LINK BETWEEN A MOBILE TERMINAL AND A NETWORK-SIDE MOBILE RADIO FACILITY, AS WELL AS MOBILE TERMINAL, NETWORK-SIDE MOBILE RADIO FACILITY, AND MOBILE RADIO SYSTEM

BACKGROUND OF THE INVENTION

1. Field of the Invention

The invention concerns a method of operating a broadband link, a mobile terminal, a network-side mobile radio facility, and a mobile radio system.

2. Description of the Related Art

There are two possibilities for the transmission of data between a mobile terminal and a mobile exchange with the GSM (Global System for Mobile Communication) of today. On the one hand data can be transparently transported via a connection according to the V.110 protocol with constant throughput and constant transmission time delay. On the other hand, data cannot be transparently transported at a low error rate with a packet-oriented protocol which is generally called RLP (Radio Link Protocol).

The invention begins with a possibility of realizing a broadband link to a mobile terminal, as described in the specification "European Digital Cellular Telecommunication System (FACE 2+) High Speed Circuit Switched Data (HSCSD); Stage 2 Service Description (GSM 03.34)" of the ETSI (European Telecommunication Standard Institute), September 1995.

This possibility represents a development of the above transmission mechanism. 2 to 8 radio channels are established for the broadband link to a mobile terminal, and assigned as subchannels to the broadband link. In this case the broadband link can be arranged for a transmission protocol with transparent transmission, or for one with nontransparent transmission.

With transparent transmission, data are transported in a frame structure according to the V.110 protocol, where numbers which indicate the subchannel are additionally transported in the band. In this way the data are distributed to the useful channels from the network-side entity of the transmission protocol, and are transported to the terminal-side entity in accordance with the V.110 protocol, where they are recombined by means of the subchannel numbers.

It was shown however that a broadband link which is based on this principle has a high error rate, since the recombination operates insufficiently because of the running time differences between the subchannels. Therefore, the transparent communication protocol (V.110) specified for this purpose by the relevant standard (GSM 03.34) has turned out to be unsuitable.

A modified RLP protocol is used for the nontransparent transmission, which is also called MRLP (Multiple Radio Link Protocol). The MRLP protocol distributes the data packets to the subchannels in the transmit-side entity, and recombines them in the receive-side entity by means of a transmission number. Furthermore, defective data packets are corrected in this protocol by means of an error correction process with repetition.

With broadband links based on this principle it was shown that the transmission time of the data packets is not constant because of the error correction, and the broadband link is therefore unable to fulfill the requirements of a synchronous connection. Thus neither of the two alternative principles can provide a broadband link which can be used for synchronous transmission.

SUMMARY OF THE INVENTION

The invention now has the task of supplying a broadband link to a mobile terminal which is also suitable for multimedia applications.

According to a first aspect of the present invention, a method of operating a broadband link for exchanging data between a mobile terminal and a network-side mobile radio facility, comprising the steps of establishing two or more radio channels to the mobile terminal via a radio interface, assigning said radio channels as subchannels to the broadband link, and transmitting the data between a terminal-side entity and a network-side entity of a communications layer via the subchannels, the entities exchanging the data as data packets of a data packet stream in accordance with a communications protocol and controlling both a distribution of the data packet stream among the subchannels and a recombination of the data packet stream, is characterized in that the protocol defines and supports two or more different packet types for data transport, and that the entities recognize the different packet types and process them as different logical channels of said communications layer in different ways.

According to a second aspect of the present invention, a mobile terminal comprising means for establishing two or more radio channels to a base station via a radio interface, means for assigning the radio channels as subchannels to a broadband link, and a terminal-side entity for exchanging data via the broadband link, said terminal-side entity for exchanging the data as data packets of a data packet stream with a network-side entity of the same communications layer via the subchannels in accordance with a communications protocol and to control both a distribution of the data packet stream among the subchannels and the recombination of the data packet stream, is characterized in that the protocol defines two or more different packet types for data transport, and that the terminal-side entity comprises means for recognizing the different packet types and means for processing said different packet types as different logical channels of the same communications layer in different ways.

According to a third aspect of the invention, a network-side mobile radio facility for exchanging data with a mobile terminal via a broadband link which is assigned two or more radio channels to the mobile terminal as subchannels, said mobile radio facility comprising a network-side entity for exchanging the data as data packets of a data packet stream with a terminal-side entity via the subchannels in accordance with a communications protocol and to control both the distribution of the data packet stream among the subchannels and its recombination, is characterized in that the protocol defines two or more different packet types for data transport, and that the network-side entity comprises means for recognizing the different packet types and means for processing said different packet types as different logical channels of a same communications layer in different ways.

According to a fourth aspect of the invention, a mobile radio system comprising means for establishing two or more radio channels to a mobile terminal via a radio interface, means for assigning the radio channels as subchannels to a broadband link, and a network-side entity for exchanging data via the broadband link, said network-side entity for exchanging the data as data packets of a data packet stream with a terminal-side entity of the same communications layer via the subchannels in accordance with a communications protocol and to control both a distribution of the data packet stream among the subchannels and a recombination of the data packet stream, is characterized in that the protocol defines two or more different packet types for data transport, and that the network-side entity comprises means for recognizing the different packet types and means for processing said different packet types as different logical channels of the same communications layer in different ways.

The basic idea of the invention for the data transport is to introduce one or more additional packet types in a protocol which functionally corresponds to the MRLP protocol.

A different treatment of these packet types, particularly in reference to the error correction process, provides two or more possible logical channels with different traffic properties in the same communications layer.

The invention has the advantage that a coded asynchronous transmission with a very low frequency of transmission errors is possible for predetermined communication contents, and simultaneously as well an unencoded transmission with constant transmission time delay. Furthermore the total bandwidth of these transmissions, and the bandwidth portion of the individual transmission types, is variable. This can be particularly advantageous for multimedia applications which require a synchronous broadband channel and a narrow-band control channel.

Using a packet type which carries a transmission number and is not subjected to error correction produces a connection with constant transmission time delay, in which the packets are correctly recombined and can therefore be best used as synchronous data connections.

An asynchronous coded connection is produced by using a different packet type with a forward sequence number where the forward sequence number is used for error protection with repetition, and for recombination.

Further advantages are obtained by the simple implementability of the solution of the invention in already existing standards and protocol structures. An additional advantage is found in the double use of the multiple MRLP service attributes, also for other (not coded and synchronous) connections.

BRIEF DESCRIPTION OF THE DRAWING

The invention is explained in greater detail in the following by means of a configuration example with the aid of the attached drawings, where.

DETAILED DESCRIPTION OF PREFERRED EMBODIMENTS

The configuration example explains how the method of the invention is carried out to produce a broadband link in a communications system according to the invention, which has a mobile terminal and a network-side mobile radio facility according to the invention.

Figure 1:
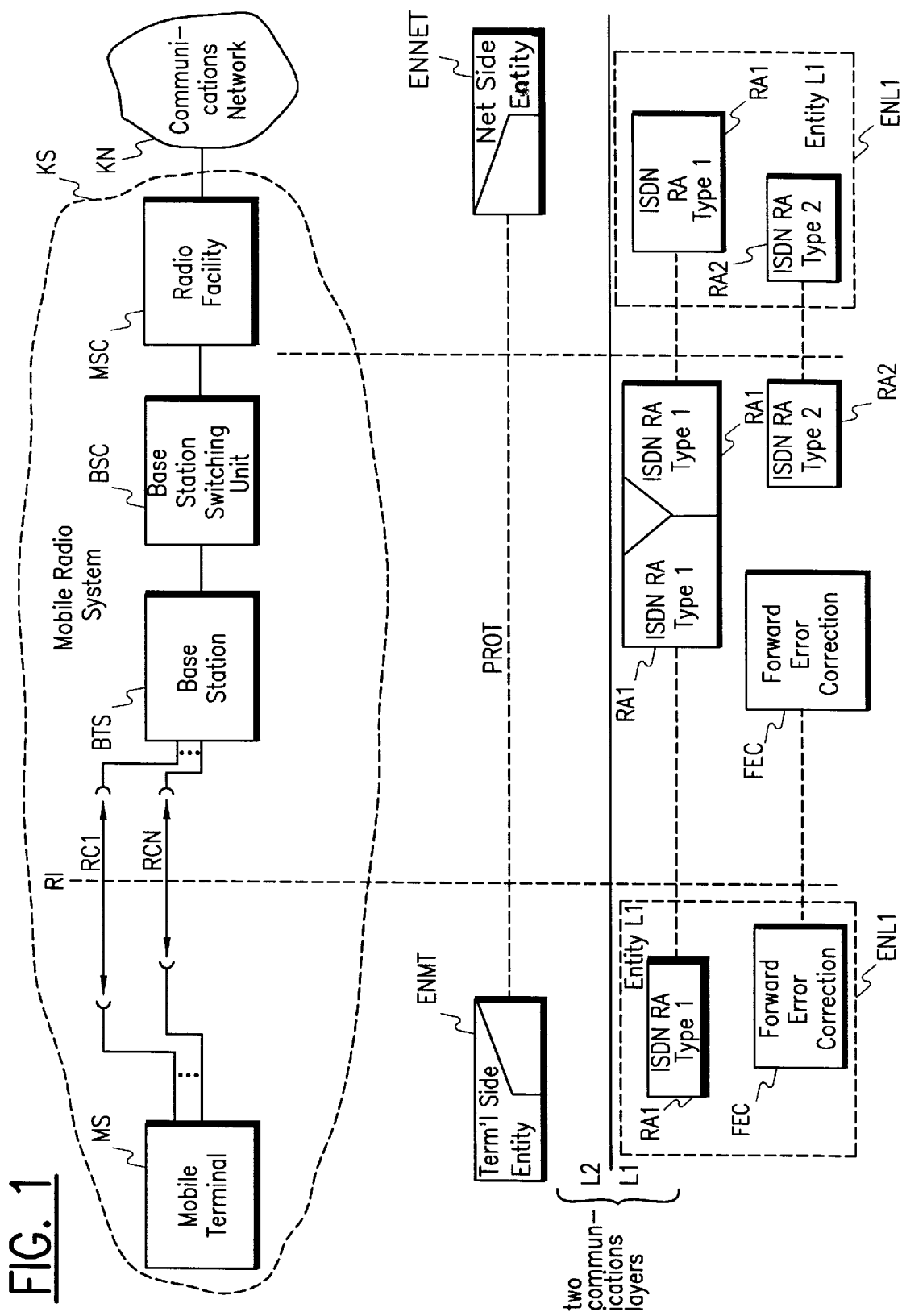
FIG. 1 is a functional illustration of a mobile radio system according to the invention, and of the data transport mechanisms used therein.

FIG. 1 illustrates a mobile radio system KS with a mobile terminal MS, a base station BTS, a base station switching unit BSC and a radio facility MSC, as well as a communications network KN. In parallel with the mobile radio system KS, FIG. 1 illustrates the functions in two communications layers L1 and L2 which are necessary to produce a broadband link between the mobile terminal MS and the mobile radio facility MSC.

The mobile radio system KS is a conventional mobile radio system, preferably according to the GSM norm. The mobile terminal MS communicates with the base station BTS via a radio interface RI, which is managed by the base station switching unit BSC. This in turn is connected to the mobile radio facility MSC, which controls the establishment of the connection to the mobile terminal MS and provides the transition to the communications network KN.

The mobile terminal MS is principally designed like a conventional mobile terminal. It has functions which also enable it to establish two or more radio channels to the base station BTS. The mobile terminal MS is preferably a terminal with an application requiring a wider broadband data link. Such terminals are for example mobile video telephones, mobile multimedia terminals, mobile (broadband) fax machines or mobile computers.

The communications network KN is a conventional fixed network, for example a telephone network. However the communications network KN can also be formed by a data network or by a mobile radio network as well. Connecting several communications networks KN is also possible, for example a telephone network and a data network.

A broadband link is established as follows: The mobile radio facility MSC causes radio channels RC1 to RCN to be established between the base station BTS and the mobile terminal MS. These channels are assigned to the broadband link and the resources of the mobile radio system KS are then arranged in a way to enable the functions needed to establish a data transport connection in communications layers L1 and L2 between the mobile radio facility MSC and the mobile terminal MS.

For the communications layer L1, the RA1' (adjustment function for adapting the data rate) and FEC (Forward Error Correction) functions are always made available in the mobile terminal MS, the FEC, RA1', RA1 and RA2 functions are made available in the base station switching unit BSC, and the RA1 and RA2 functions in the mobile radio facility MSC. In this case the functions of the communications layer L1 are available once for each radio channel RC1 to RCN and must therefore be adjusted once for each of the radio channels RC1 to RCN. The FEC function performs the error correction in the respective radio channel RC1 to RCN. The RA1, RA1' and RA2 functions represent adjustment functions for adapting the data rate.

The functions of communications layer L1 are carried out for each of the subchannels in the mobile terminal MS and in the mobile radio facility MSC in one entity ENL1 respectively. The functions of communications layer L2 are carried out in the mobile terminal MS by an entity ENMT, which is also called a terminal-side entity in the following. The functions of communications layer L2 are carried out in the mobile radio facility MSC by an entity ENNET, which is also called a network-side entity in the following. The entities ENMT and ENNET provide the transport connection for the broadband link, where the transportation takes place in accordance with a data transmission protocol PROT. To transport the data, the entities ENMT and ENNET make use of the respective 8 entities ENL1, which in each case offer transportation as a service through one of the radio channels RC1 to RCN. In this case the radio channels RC1 to RCN are assigned as subchannels to the broadband link.

It is also possible to locate the network-side entities ENNET and ENL1 in the base station BTS or in the base station switching unit BSC. In addition to integrating the entities ENNET and ENL1 into a mobile radio facility, it is also possible to provide the entities in a downstream switching unit or centrally for several mobile radio facilities in a central switching unit.

Figure 2:
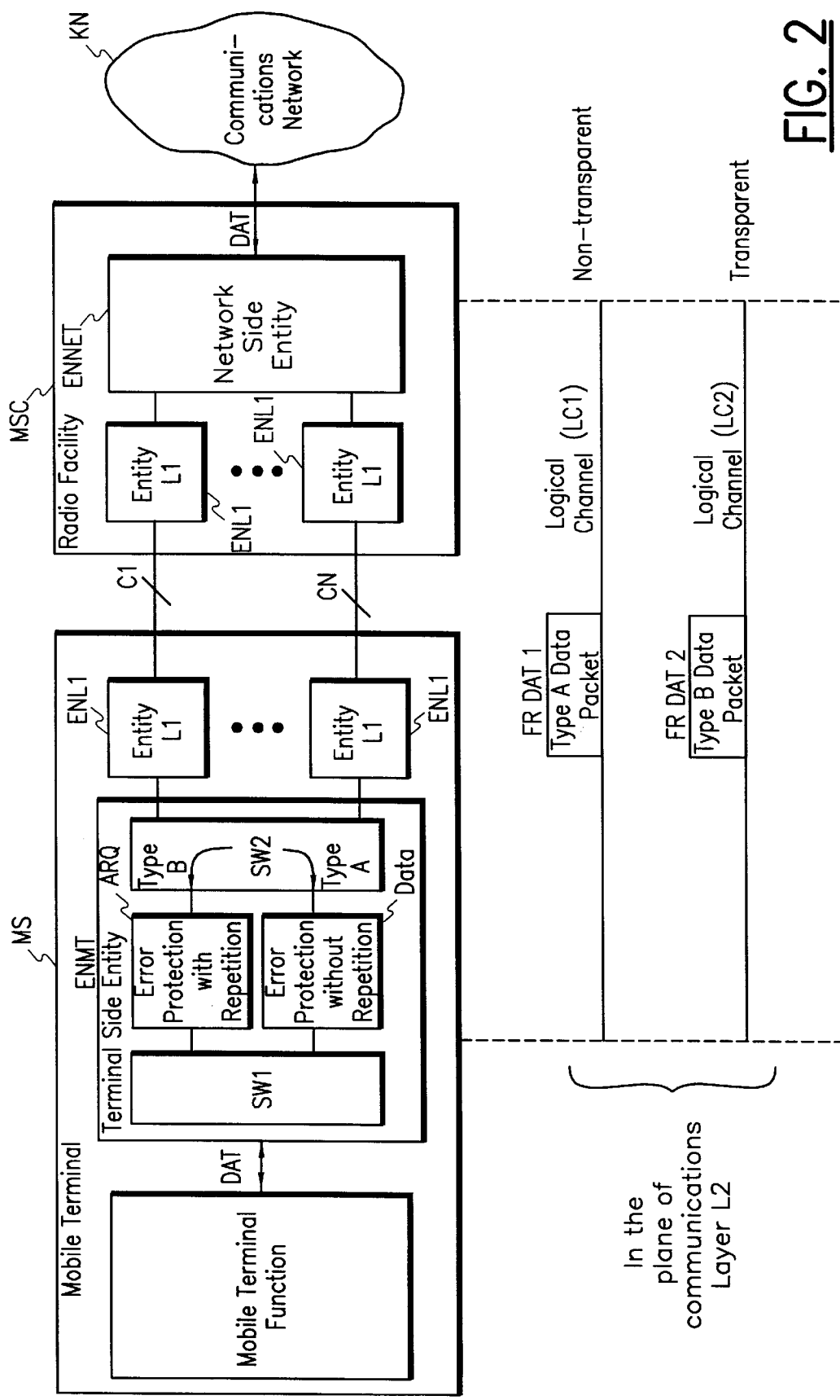
FIG. 2 is a more detailed functional illustration of the transport mechanisms in FIG. 1.

The data transport for the broadband link will now be depicted in more detail by means of FIG. 2. FIG. 2 illustrates the mobile terminal MS, the mobile radio facility MSC and the communications network KN. In parallel thereto, FIG. 2 illustrates two logical channels LC1 and LC2 in the plane of communications layer L2 to clarify the transport mechanism.

The mobile terminal MS has a function MTF, the entity ENMT and the N entities ENL1. The mobile radio facility MSC has the N entities ENL1 and the entity ENNET. In each case the entities of mobile terminal MS are connected to the corresponding entities ENL1 of the mobile radio facility MSC through one of the N subchannels C1 to CN.

The MTF function represents the mobile terminal MS function which communicates through the broadband link. As already explained earlier, both entities ENMT and ENNET provide a transport service in communications layer 2, and in turn use the transport services of entities ENL1.

The MTF function exchanges data DAT with the entity ENMT, which are sent out by the MTF function via the broadband link, or which are received for the MTF function via the broadband links. In the same way the entity ENNET exchanges data DAT with the communications network KN, which are either sent to the MTF function via the broadband link, or are sent to a subscriber of the communications network KN when they come from the MTF function.

The entities ENMT and ENNET are constructed in an analogous way to each other and carry out their functions in accordance with the protocol PROT. The following describes the functions of the entity ENMT as an example.

The entity ENMT communicates with the entity ENNET by sending it and receiving from it data packets by means of the entities ENL1. Different types of data packets are available for this communication. On the one hand they are control packets which are used to control the connection, for example to establish a connection or to reestablish the connection after an error is detected. On the other hand two different types of useful data packets are provided, type A and type B, which are used to transport data. In this case the various types of control and useful data packets differ by means of an identification in the header of the respective data packet. They are treated in the entity ENMT in accordance with this identification, either as control data packets or as useful data packets of the A- or the B-type.

The entity ENMT has four functions SW1, SW2, ARQ, DATA which are used to process data packets for the transport of useful data.

Useful data packets received by the entities ENL1 are directed to the function SW2. This function SW2 checks the identification of an arriving useful data packet and determines whether it is a type A or a type B useful data packet. Type A useful data packets are then directed to the ARQ function and type B useful data packets are directed to the DATA function.

The ARQ function performs an error protection for the type A useful data packets. Upon detecting an error in a data packet, or upon detecting the loss of a data packet, it requests the entity ENMT to repeat the false or the lost data packet. The ARQ function makes such a request by sending special control data packets to the entity ENMT. For the precise performance of this error correction process reference is made to the September 1995 norm GSM 03.34 already indicated earlier.

It is also possible for the ARQ function to perform a different error correction with repetition. In addition to the error correction, the ARQ function also performs the recombination of the type A useful data packets. On the transmit-side, these data packets are distributed by the entity ENNET to the subchannels C1 to CN, so that they are recombined in the proper sequence by the entity ENMT. This task is also performed by the ARQ function by means of the transmission number already used for the error correction, which is transmitted in the header of the type A useful data packets. Details can also be found in the above-mentioned norm GSM 03.34 of September 1995. Next the type A useful data packets, which are now in the correct sequence, are directed to the SW1 function.

The DATA function processes the type B useful data packets. In contrast to ARQ function, it provides no protection for these data packets through repetition. Not using any error protection at all has the advantage in this case that it increases the useable capacity of the Type B useful data packets. Error correction processes without repetition are for example the error correction processes according to Hamming.

The DATA function performs a recombination of the type B useful data packets. To that end it uses a forward sequence number which, when split by the entity ENNET, is inserted into the header of each type B useful data packet and indicates the original sequence of the data packets. The type B useful data packets are arranged by the DATA function in accordance with this number and are then directed to the SW1 function.

It is also possible for the DATA function to use a different method for the recombination. In this case it is possible for example to insert the number of the subchannel via which it transmitted, into the header of each type B useful data packet.

The SW1 function receives type A and type B useful data packets. It picks up the useful data from the data packets and sends them either in two separate data streams or in a single data stream to the MTF function, depending on the data format requested by the latter.

In the reverse, the SW1 function assigns the data DAT which is directed to it by the MTF function either to the type A or the type B packet. In this case the assignment takes place on the basis of the physical or the logical channel to which the arriving data DAT are assigned, or on the basis of the control signals received by the MTF function. Depending on their assignment, the data are then packaged in type A or type B useful data packets and directed to the ARQ or DATA functions. The ARQ and DATA functions then split their respective type of useful data packets into the subchannels C1 to CN and further direct the useful data packets to the respective entities ENL1. In this way each of the subchannels C1 to CN can jointly transmit type A and type B useful data packets.

Thus there are two different logical connections LC1 and LC2 with different traffic characteristics between the entities MS and MSC. The logic connection LC1 is formed by the exchange of type A useful data packets FRDAT1 and the logical connection LC2 is formed by the exchange of type B useful data packets FRDAT2. The control and management of the link takes place jointly for both logic connections LC1 and LC2.

In accordance with the basic solution of the present invention, in the packet protocol for the non-transparent transmission, besides the non-transparently treated packet type (FRDAT1), a new packet type (FRDAT2) is introduced, which is treated transparently and thus meets synchronization requirements for synchronous applications such as multi-media. Transparent and non-transparent transmission, such as on the logical connections described above, is supported by the same packet protocol. This is easy to implement according to existing standards and provides for parallel transparent and non-transparent (and protected) transmission with variable bandwidth possible (broad synchronous bearer channel, narrow-band asynchronous control channel). This advantageous use of the various service features of the packet protocol is thereby also provided for transparent transmission.

It is also possible that other types of useful data packets are defined by the PROT protocol and that therefore other functions, which correspond to the ARQ and DATA functions, are inserted into the entities ENMT and ENNET. These other types of useful data packets would support other logical connections according to LC1 and LC2. These other types of useful data packets would be processed differently with reference to the error correction or recombination according to the statements about the DATA and ARQ functions.

It is also possible that only a single one of the two packet types A and B is used for the transmission of a broadband link, or that one or the other type are used alternately during the connections.

Figure 3:
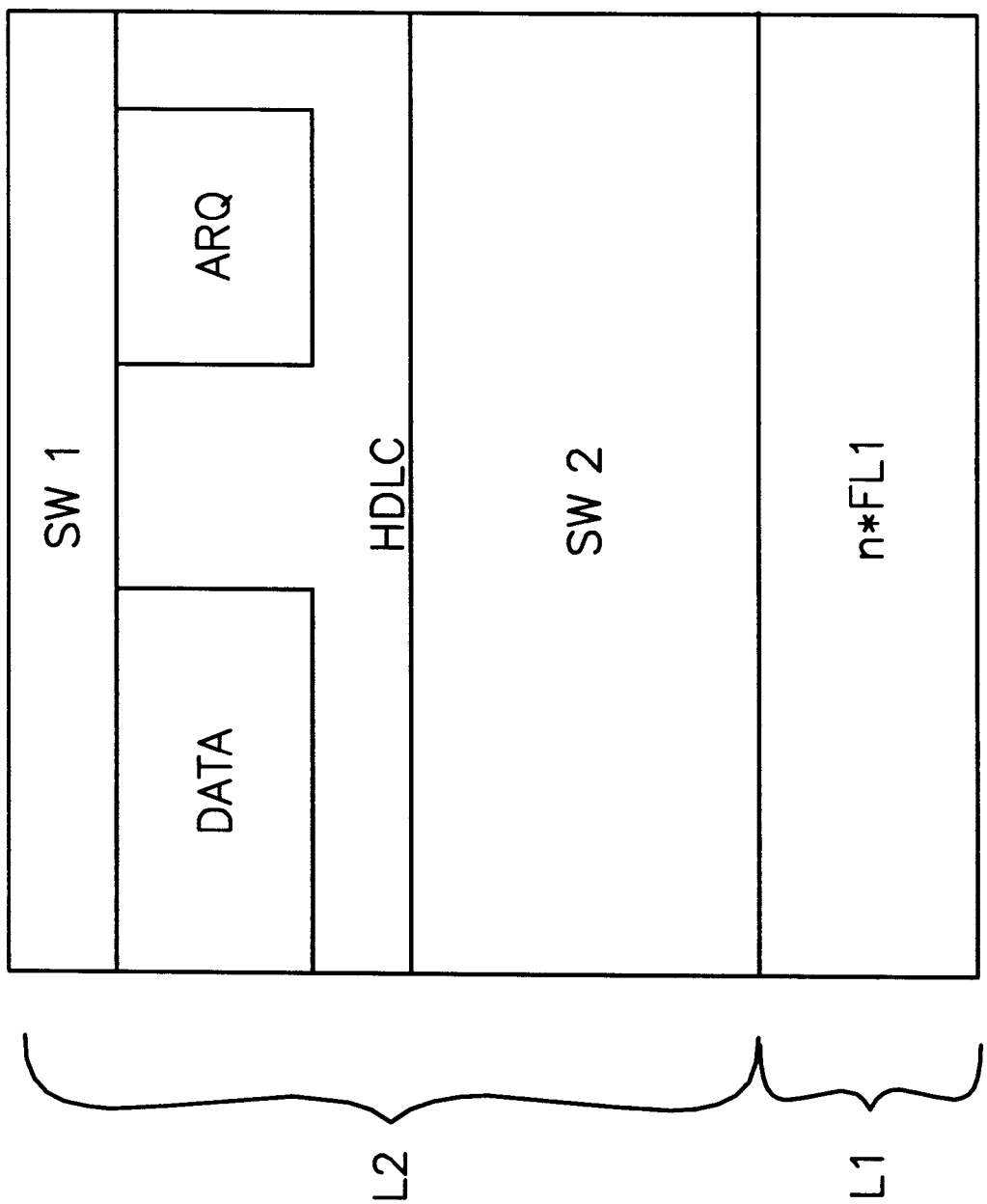
FIG. 3 is an illustration of the protocol structure of the communication mechanisms in FIG. 1.

By means of a layer model, FIG. 3 explains in more detail the interaction of the functions required to make the broadband link available. FIG. 3 illustrates the communications layers L1 and L2.

Communications layer L1 has N functions FL1, each providing the service of transporting data via one of the subchannels C1 to CN of communications layers L2.

Communications layer L2 has the already described SW2, SW1, DATA and ARQ (Automatic Repeat Request) functions, as well as an HDLC (High-level Data Link Control) function.

The HDLC function performs the control and management of the link in communications layer 2. It is responsible for establishing, clearing and reestablishing the link after an interruption and for managing the available communication resources. It requests further subchannels C1 to CN for example, releases such subchannels and determines which of the subchannels operates in the one or the other direction. Potential service features of the HDLC function can be found in the above-cited norm GSM 03.34 of September 1995. In this case the HDLC function provides its services for both types of useful data packets A and B.

The following hierarchy results for the functions and sequences defined by the protocol PROT: The SW2 function is based on the FL1 functions of communications layer L1. The HDLC function is based on the SW2 function, while the DATA and ARQ functions are integral components of this function. The SW1 function is based on the HDLC, DATA and ARQ functions.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

We claim:

1. A method of operating a broadband link for exchanging data (DAT) between a mobile terminal (MS) and a network-side mobile radio facility (MSC), comprising the steps of establishing two or more radio channels (RC1 to RCN) to the mobile terminal (MS) via a radio interface (RI), assigning said radio channels (RC1 to RCN) as subchannels (C1 to CN) to the broadband link, and transmitting the data (DAT) between a terminal-side entity (ENMT) and a network-side entity (ENNET) of a communications layer (L2) via the subchannels (C1 to CN), the entities (ENMT, ENNET) exchanging the data (DAT) as data packets of a data packet stream in accordance with a communications protocol (PROT) and controlling both a distribution of the data packet stream among the subchannels (C1 to CN) and a recombination of the data packet stream, characterized in that the protocol (PROT) defines and supports two or more different packet types (FRDAT1, FRDAT2) for data transport, and that the entities (ENMT, ENNET) recognize the different packet types and process them as different logical channels (LC1, LC2) of said communications layer (L2) in different ways.

2. A method as claimed in claim 1, characterized in that the data (DAT) are transmitted between the entities (ENMT, ENNET) simultaneously by means of said different packet types.

3. A method as claimed in claim 1, characterized in that the data (DAT) are transmitted between the entities (ENMT, ENNET) by means of a single one of the two or more different packet types.

4. A method as claimed in claim 1, characterized in that the protocol (PROT) provides the functions of a modified radio link protocol (MRLP).

5. A method as claimed in claim 1, characterized in that two packet types, a first and a second packet type, are defined, and that the entities (ENMT, ENNET) process the first packet type using an error-protection technique with automatic request for repetition (ARQ), while this error-protection technique is avoided for the second packet type.

6. A method as claimed in claim 5, characterized in that the second packet type includes a send sequence number for recombination.

7. A mobile terminal (MS) comprising means for establishing two or more radio channels (RC1 to RCN) to a base station (BTS) via a radio interface (RI), means for assigning the radio channels (RC1 to RC2) as subchannels (C1 to CN) to a broadband link, and a terminal-side entity (ENMT) for exchanging data (DAT) via the broadband link, said terminal-side entity (ENMT) for exchanging the data as data packets of a data packet stream with a network-side entity (ENNET) of a same communications layer (L2) via the subchannels (C1 to CN) in accordance with a communications protocol (PROT) and to control both a distribution of the data packet stream among the subchannels (C1 to CN) and a recombination of the data packet stream, characterized in that the protocol (PROT) defines two or more different packet types for data transport, and that the terminal-side entity (ENMT) comprises means (SW1) for recognizing the different packet types and means (DATA, ARQ) for processing said different packet types as different logical channels (LC1, LC2) of the same communications layer (L2) in different ways.

8. A network-side mobile radio facility (MSC) for exchanging data (DAT) with a mobile terminal (MS) via a broadband link which is assigned two or more radio channels (RC1 to RCN) to the mobile terminal (MS) as subchannels (C1 to CN), said mobile radio facility comprising a network-side entity (ENNET) for exchanging the data (DAT) as data packets of a data packet stream with a terminal-side entity (ENMT) via the subchannels in accordance with a communications protocol (PROT) and to control both the distribution of the data packet stream among the subchannels (C1 to CN) and its recombination, characterized in that the protocol (PROT) defines two or more different packet types (FRDAT1, FRDAT2) for data transport, and that the network-side entity (ENNET) comprises means for recognizing the different packet types and means for processing said different packet types as different logical channels (LC1, LC2) of a same communications layer (L2) in different ways.

9. A network-side mobile radio facility as claimed in claim 8, characterized in that the mobile radio facility is a mobile switching center.

10. A network-side mobile radio facility as claimed in claim 8, characterized in that it is connected to the mobile terminal by means of a base station switching unit (BSC) and a base station.

11. A mobile radio system (KS) comprising means for establishing two or more radio channels (RC1 to RCN) to a mobile terminal (MS) via a radio interface (RI), means for assigning the radio channels (RC1 to RCN) as subchannels (C1 to CN) to a broadband link, and a network-side entity (ENNET) for exchanging data (DAT) via the broadband link, said network-side entity (ENNET) for exchanging the data (DAT) as data packets of a data packet stream with a terminal-side entity (ENMT) of a same communications layer (L2) via the subchannels in accordance with a communications protocol (PROT) and to control both a distribution of the data packet stream among the subchannels (C1 to CN) and a recombination of the data packet stream, characterized in that the protocol (PROT) defines two or more different packet types (FRDAT1, FRDAT2) for data transport, and that the network-side entity (ENNET) comprises means for recognizing the different packet types and means for processing said different packet types as different logical channels (LC1, LC2) of the same communications layer (L2) in different ways.

* * * * *